United States Patent
Rajagopal et al.

(10) Patent No.: US 7,797,749 B2
(45) Date of Patent: Sep. 14, 2010

(54) DEFENDING AGAINST WORM OR VIRUS ATTACKS ON NETWORKS

(75) Inventors: Priya Rajagopal, Wharton, NJ (US); Ravi Sahita, Beaverton, OR (US); David Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1455 days.

(21) Appl. No.: 10/980,015

(22) Filed: Nov. 3, 2004

(65) Prior Publication Data

US 2006/0095970 A1    May 4, 2006

(51) Int. Cl.
    *G08B 23/00*    (2006.01)
(52) U.S. Cl. ............... 726/25; 726/22; 726/23; 726/24; 713/188
(58) Field of Classification Search ........... 726/26, 726/23–25; 713/201, 188
    See application file for complete search history.

(56) References Cited

U.S. PATENT DOCUMENTS

| | | | |
|---|---|---|---|
| 5,748,888 A * | 5/1998 | Angelo et al. ............. 726/26 |
| 5,884,033 A | 3/1999 | Duvall et al. .......... 395/200.36 |
| 5,991,881 A | 11/1999 | Conklin et al. ............. 713/201 |
| 6,301,668 B1 * | 10/2001 | Gleichauf et al. .......... 713/201 |
| 6,598,081 B1 | 7/2003 | Coile et al. ............... 709/227 |
| 6,725,378 B1 | 4/2004 | Schuba et al. ............. 713/201 |
| 6,772,334 B1 | 8/2004 | Glawitsch .................. 713/153 |
| 6,779,033 B1 | 8/2004 | Watson et al. ............. 709/227 |
| 6,789,203 B1 | 9/2004 | Belissent ................. 713/201 |
| 6,944,663 B2 | 9/2005 | Schuba et al. ............. 709/225 |
| 7,213,260 B2 * | 5/2007 | Judge ........................ 726/3 |
| 2002/0032871 A1 | 3/2002 | Malan et al. ............... 713/201 |
| 2004/0111531 A1 * | 6/2004 | Staniford et al. ............ 709/246 |
| 2004/0255159 A1 * | 12/2004 | Williamson et al. ......... 713/201 |
| 2005/0149747 A1 * | 7/2005 | Wesinger et al. ............ 713/200 |
| 2005/0276228 A1 | 12/2005 | Yavatkar et al. ............ 370/242 |
| 2006/0005245 A1 | 1/2006 | Durham et al. ............. 726/25 |
| 2006/0206943 A1 * | 9/2006 | Ellison et al. ............. 726/26 |
| 2006/0272025 A1 * | 11/2006 | Mononen .................... 726/26 |
| 2007/0143857 A1 * | 6/2007 | Ansari ........................ 726/26 |
| 2007/0283444 A1 * | 12/2007 | Jang ............................ 726/26 |

OTHER PUBLICATIONS

Krill Levchenko, On the difficulty of scalably Detecting Network Attacks, Dec. 18, 2007, Cs.USCD.edu.*

Matthew M. Williamson et al., "Virus Throttling", Virus Bulletin, Mar. 2003, Research Feature 1, p. 8-11, Virus Bulletin Ltd, The Pentagon, Abingdon, Oxfordshire, OX14 3YP, England.

* cited by examiner

*Primary Examiner*—Kambiz Zand
*Assistant Examiner*—Amare Tabor
(74) *Attorney, Agent, or Firm*—Trop, Pruner & Hu, P.C.

(57) ABSTRACT

A combination of more frequent and less frequent security monitoring may be used to defeat worm or virus attacks. At periodic intervals, a risk assessment scan may be implemented to determine whether or not a worm attack has occurred. Prior thereto, an intermediate detection by an anomaly detection agent may determine whether or not a worm attack may have occurred. If a potential worm attack may have occurred, intermediate action, such as throttling of traffic, may occur. Then, at the next risk assessment scan, a determination may be made as to whether the attack is actually occurring and, if so, more effective and performance altering techniques may be utilized to counter the attack.

23 Claims, 5 Drawing Sheets

DEFENDING AGAINST WORM OR VIRUS ATTACKS ON NETWORKS

BACKGROUND

This invention relates to network security and particularly to defending against virus and worm attacks.

A worm is a program that self-propagates across a network, exploiting security or policy flaws in services. Often a worm scans a network for potential targets. A denial of service may occur when network bandwidth is consumed as a result of an excessive number of connections that are opening during worm probing of a network.

A virus is an intrusive program that infects computer files by inserting copies of itself in those files. The copies may be executed when the file is loaded into memory, allowing the copies to infect still other files.

The security of an enterprise, such as a network, is dependent to some degree on the enforcement of security provisions at each station on that network. Generally, security systems may be software-based in the form of applications or operating system kernel drivers on individual stations. These capabilities are vulnerable to malicious/mal-configured/faulty components that can actively intrude or step on the operating system functions locally or remotely. Also, software-based critical security applications can be turned off by the user, thereby reducing the overall security and manageability of an enterprise network.

Fast propagating worms are a severe threat to networks today. The propagation rate of these worms is high enough to infect the entire Internet within minutes. This implies that a network administrator has no time to react to such worms. Moreover, these fast propagating worms may also consume significant portions of network bandwidth thereby making it difficult for a network administrator to access the infected systems or networks.

Thus, there is a need for a way to protect systems, for example, when operating system resident security agents have been tampered with.

DETAILED DESCRIPTION

Figure 1:
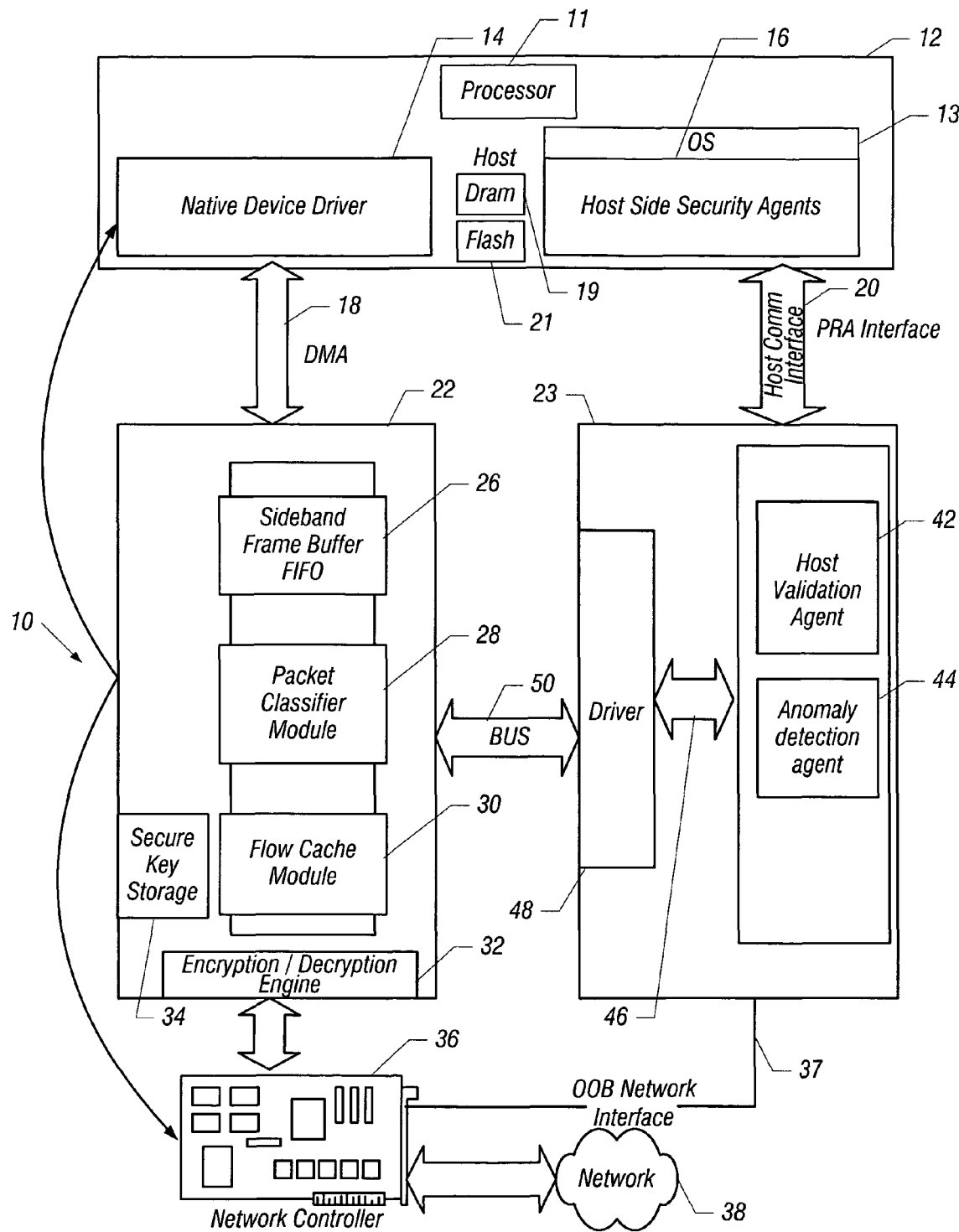
FIG. 1 is a system depiction of one embodiment of the present invention.

Referring to FIG. 1, a framework may provide security features for a platform or host 12 (top of FIG. 1). At the bottom of FIG. 1 is a network controller 36 coupled to a network 38. In between are two flows, one including inline processing elements 22 (on the left) and the other including sideband processing elements 23 (on the right). The inline processing elements 22 lie in the direct path of network traffic. The sideband processing elements 23 may be implemented in an isolated, tamper-resistant environment such as an embedded processor.

The inline processing elements 22 may be responsible for faster path data processing. They may be implemented as hardware (for example, as part of a communications controller itself) or they may be implemented as software (for example, as part of the host device driver).

The flow cache module 30 represents a flow cache that holds the history of most recently seen flows. Additionally, per-flow connection statistics such as byte and packet count, time stamps, and protocol options such as Internet Control Message Protocol (ICMP) error codes, Transmission Control Protocol (TCP) flags, etc. may be recorded. The packet classifier module 28 represents a packet header based classifier used for classifying flows based on specified fields in the header. As a result of classification, specific actions may be taken including dropping a flow or throttling a flow, to give two examples.

The sideband communication link, such as the frame buffer first in, first out (FIFO) buffer 26, is responsible for redirecting packets to the sideband processing elements 23 instead of the main host 12 stack. This enables the sideband processing elements 23 to more thoroughly analyze questionable packet payloads and to choose to re-inject a packet into the host first in, first out buffer 26 or to drop the packet.

Encryption/decryption engine 32 may be used for encrypting and decrypting traffic that flows in or out of the host 12. The encryption/decryption keys may be made available through secure storage 34 accessible only to the hardware. In some embodiments, encryption and decryption may not be used.

The sideband processing elements 23 may be hardware/software components implemented on an embedded, low power processor in one embodiment. The sideband processing elements 23 may have direct access to a partitioned flash memory 21 or other non-volatile memory. The sideband processing elements 23 may have restricted read-only access to host dynamic random access memory (DRAM) 19 and the ability to sequester a small chunk of the host DRAM 19 for its own private purposes. An operating system 13 will not use the sequestered memory region devoted to the sideband processing elements 23. In some embodiments, such sequestering of host memory may not be used.

Using the protected access to the host DRAM 19, the sideband processing elements 23 may access the host device driver performance information such as statistics and counters to determine configuration and state, including utilization and availability. This feature may be used when inline processing elements 22 are implemented in software. If the inline processing elements 22 are implemented in hardware, for example as part of a communications controller, then the sideband processing elements 23 may be located within the communication controller with direct access to monitor statistics collected by that communications controller.

The interface driver 48 is used for communicating with the inline processing elements 22. It implements the appropriate bus protocols for communicating with other elements. The statistical information from the inline processing elements 22 may be presented to an anomaly detection agent 44.

The anomaly detection agent 44 is used to process the statistics that are collected by the flow cache module 30, using heuristics-based behavioral analysis of worms. Based on the result of that analysis, the agent 44 can install appropriate remedial filters to throttle or cut off communications via the packet classifier module 28.

Viruses may be detected, for example, by searching for a sequence of bytes or a decryption routine as a "signature" in a packet payload. The packet payload may be analyzed using tools that cause packet fragmentation. Viruses may be detected in file extensions in the transfer/open session or in intercepted mail headers with attachments. Infection may also be detected by operating system software that intercepts "open" system calls.

Instead of using signature analysis, heuristics may be used to analyze the behavior of a program. Behavioral heuristics attempt to capture the scanning/propagation behavior of worms that attempt to scan for potential targets on network after infecting a system in that network. Examples of such heuristics are as follows:

| Purpose | Condition | Action |
|---|---|---|
| Prevent client from doing an address scan to locate all the other machines on network. | In last 'x' msec, number of connections with a unique destination address exceeds threshold | Throttle all outgoing connections to specified dst address range (if non-random). Throttle all outgoing connections (if random addresses) |
| Prevent client from doing a port scan on a specific destination | In last 'x' msec, number of connections with a unique port address exceeds threshold | Throttle all outgoing connections to specified dst port range (if non-random). Throttle all outgoing connections (if random ports) |
| To prevent IP address spoofing from client | Connections with (src address != self) | Pre-action: Intercept and record DHCP exchange to get IP address assigned. Block all outbound traffic not from self |
| Prevent clients from doing a NULL scan (TCP packets with no flags set). | In last 'x' msec, number of outbound connections with (protocol = TCP and tcpflags = NONE ) exceeds threshold | Throttle/block all outgoing TCP connections with tcpflags = NONE. |
| Prevent clients from doing a XMAS scan (TCP packets with all flags set). | In last 'x' msec, number of connections with (protocol = TCP, tcpflags = ALL) exceeds threshold | Throttle/block all outgoing TCP connections with tcpflags = ALL. |
| Prevent clients from opening connections to restricted ports. | In last 'x' msec, number of connections with (dst port = restricted) exceeds threshold | Pre-action: Configure restricted ports. Throttle all outgoing connections to the restricted dst port range (if non-random). Throttle all outgoing connections (if random ports) |
| Prevent client from scanning for vulnerable service which is residing at port Y | In last 'x' msec, number of connections with (dst port = Y) exceeds threshold | Throttle all outgoing connections to specified dst port 'Y' |
| To protect a system from a UDP scan that may be launched on system from a set of external machines | In last 'x' msec, number of connections, protocol = ICMP, ICMP type = ICMP port unreachable errors) exceeds threshold | Block all inbound traffic to port specified in ICMP error messages. |
| Prevent clients from doing an ICMP echo based port scan. | In last 'x' msec, number of connections with (protocol = ICMP, ICMP type = ICMP echo request) exceeds threshold | Throttle all outgoing ICMP echo requests |
| Prevent clients from doing a TCP FIN scan which is a stealth port scan using FIN. | In last 'x' msec, number of connections with (protocol = TCP, tcpflags = FIN) exceeds threshold | Throttle/block all/specified outgoing TCP connections with flags = FIN. |
| Prevent clients from doing a half-open scan (SYN sent and RST is sent in response to SYN-ACK). | In last 'x' msec, number of connections with (src address = self, protocol = TCP, tcpflags = SYN & RST) exceeds threshold | Throttle/block all/specified outgoing TCP connections with flags = SYN & RST |
| Prevent clients from doing a TCP SYN scan. | In last 'x' msec, number of connections with (protocol = TCP, tcpflags = SYN) exceeds threshold | Throttle/block all/specified outgoing TCP connections with flags = SYN. |

The host validation agent 42 is used for periodically validating whether the host resident security agents 16 are up and running. These agents 16 may include intrusion detection agents such as virus protection or firewall software. The host resident security agents 16 in turn validate whether the operating system and antivirus software on the host 12 is up to date and running properly.

In one embodiment, the inline processing elements 22 may communicate with the host 12 using direct memory access 18. The sideband processing elements 24 may utilize a host communication interface 20 which also may constitute a risk assessment interface.

Also, communication between the inline processing elements 22 and sideband processing elements 23 may be implemented via a bus 50. The sideband processing elements 23 may communicate directly with the network controller 36 via an out of band network interface 37. A secure key storage 34 may be provided within the inline processing elements 22.

The host 12 may include a native device driver 14, and a processor 11. The platform or host 12 may periodically verify whether the operating system resident security agents 16 are installed and functioning. This operation may be referred to as platform risk assessment (PRA) technology. By using the platform risk assessment technology to periodically verify that operating system resident security agents 16 are installed and functioning as expected, the platform can be viewed as the first line of defense that checks the checker.

During this vulnerable period between risk assessment checks, the platform 12 continues to monitor the network traffic that enters and leaves the system 10 and effects appropriate actions if it notices any deviation from normal traffic behavior. These actions may include completely isolating the system 10 from the network 38, throttling outbound traffic, and other actions referred to as network circuit breaker (CB) technology. This kind of platform intelligence serves as a rapid response technique for containing fast propagating worm attacks that occur in the vulnerable period between risk assessment scans and may prevent an infected host 12 from infecting other vulnerable hosts in the network 38.

If it is suspected that the system 10 is under attack, the anomaly detection agent 44 may initiate the appropriate benign actions, like throttling traffic, until the next risk assessment scan is completed. If that risk assessment scan shows nothing wrong with the operating system resident security agents 16, and the event is deemed a false alarm, traffic is allowed to continue unimpeded. Conversely, the heuristics can also be adapted to reduce the number of false alarms. On the other hand, if the risk assessment scan indicates that operating system resident security agents 16 were tampered with in any way or reported some problem, such as the operating system service being down, then the anomaly detection agent 44 may block the outbound traffic from the system 10 and send an alert to a remote administrator. For example, the agent 44 can use the packet classifier module 28 to implement filters to control inbound or outbound flows. Thus, the network security breaker and risk assessment components collaboratively function as a closed loop feedback system to monitor the system security posture.

Periodically, the host validation agent 42 on the sideband processing elements 23 runs a risk assessment scan to check if the host resident security agents 16 are functioning properly. The validated host resident security agents 16 then proceed to validate whether the operating system 13 and other firewall software running on the host 12 is working correctly. Since risk assessment scans can be time consuming and expensive operations, they need not be performed frequently (on the order of a few seconds). Cache analysis, which refers to the analysis of the flow cache by the anomaly detection agent 44 may be simple, fast, and may be done more frequently between risk assessment scans.

Figure 2:
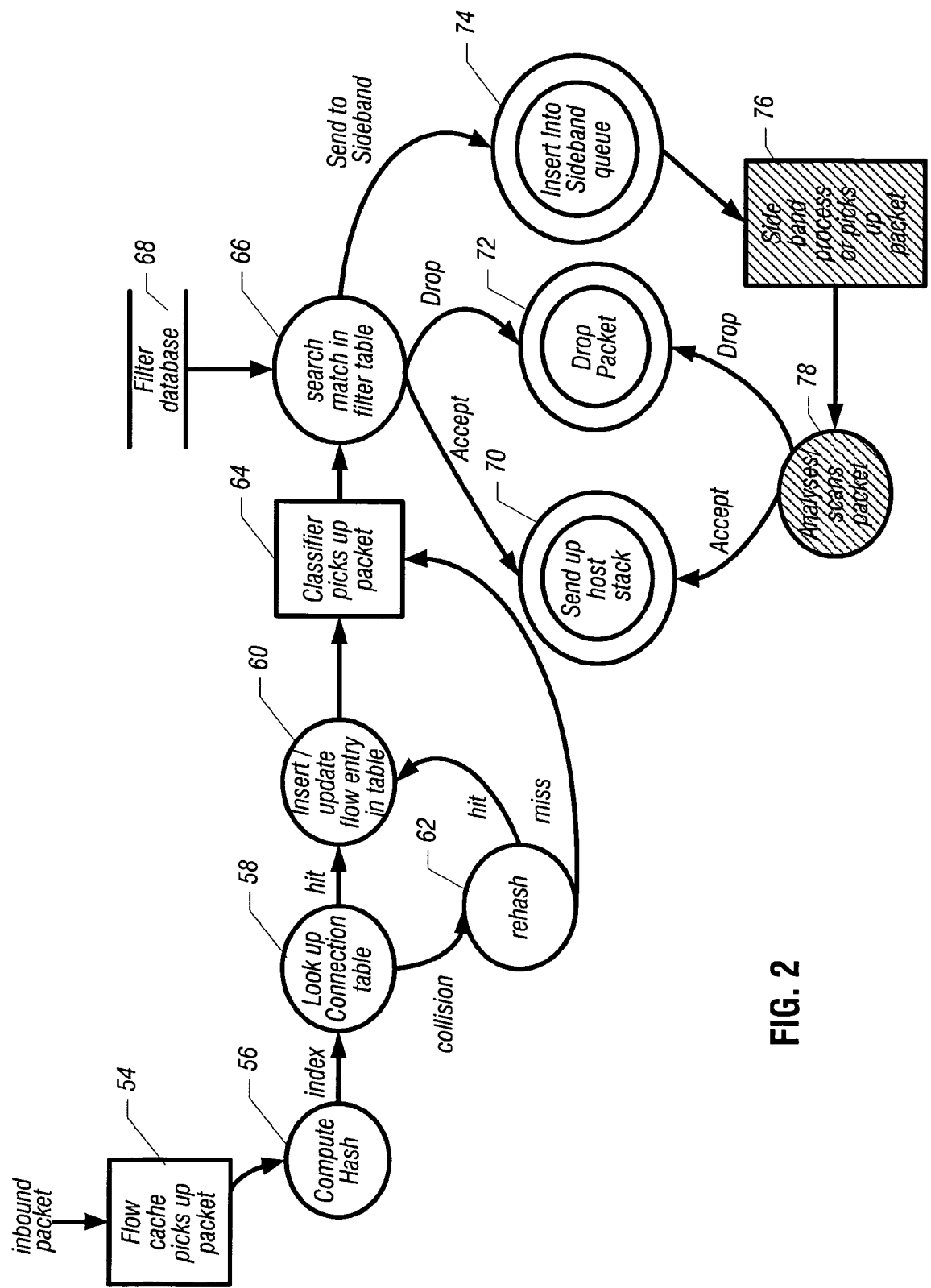
FIG. 2 is an inbound packet flow in accordance with one embodiment of the present invention.

Inbound packets are processed by the inline processing elements 22 according to the flow shown in FIG. 2 in one embodiment of the present invention. When a packet arrives at the system 10, it may be decrypted, if necessary, and picked up by the flow cache module 30 (FIG. 1) as shown in block 54.

A hash value may be computed at 56 to obtain an index value into a connection table in the flow cache module 30 as indicated at 58. The hash value is generated based on header information in packets which are part of the flow received by the module 28. The flow cache module 30 maintains a connection table with information about recently processed flows. If the computed hash value belongs in the connection table (a "hit"), the flow entry in the cache is either inserted or updated at 60. If there is a collision, meaning that the index is to an already used location in the connection table, then there may be a rehash at 62. If there is a hit after rehashing, then the data is inserted into the connection table at 60. Otherwise, the flow proceeds onto classification, as indicated at block 64, in the packet classifier module 26 (FIG. 1).

The classifier module 28 searches for a match in a filter table contained in a filter database 68 as indicated at 66. Characteristics of the packet such as its source address, destination address, source port, destination port and/or protocol from the packet header may be analyzed to obtain information about whether the packet may indicate virus or worm behavior. For example, too much outbound traffic or a large number of unique connections may be indicative of worm behavior. The characteristics may be searched in the filter database 68 against heuristics or rules that may be stored in the side band processing elements 23. This results in the packet being accepted, dropped, or sent to the sideband processing elements 23 as indicated at 70, 72, and 74. The packet is dropped at 72 if the filter table search clearly indicates a threat. The packet is accepted at 70 if nothing is found to indicate the packet is a threat. The packet may also be sent to the sideband processing elements 23 queue via the path 74 if the initial analysis is inconclusive. The sideband processing elements 23 further process the packet, as indicated at 76, and analyze and scan the packet at 78 to determine whether a threat is indicated. The packet is then either sent up to the host stack or dropped as indicated at 70 and 72.

Appropriate filters may be installed in the packet classifier module 28 by the sideband processing elements 23. These filters are the filters maintained by the classifier module 28 that can regulate flows through the inline processing elements 22.

Figure 3:
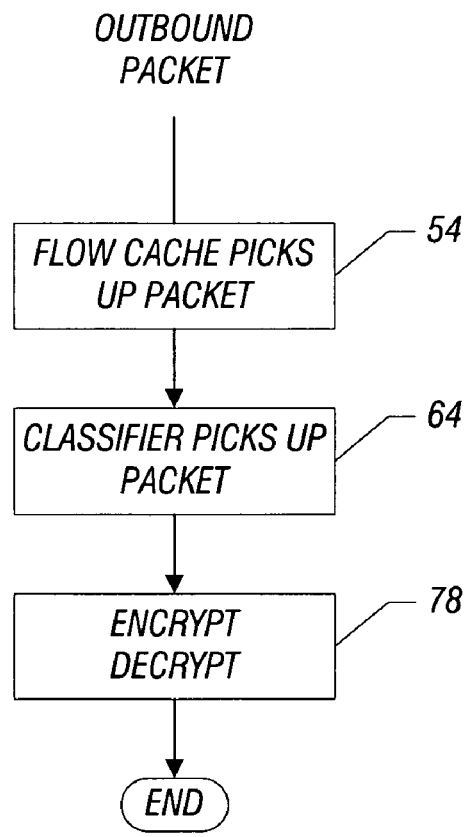
FIG. 3 is an outbound packet flow in accordance with one embodiment of the present invention.

Outbound packet processing, shown in FIG. 3, is recorded by the flow cache module 30 as indicated at 54. Then, the classifier module 28 picks up the packet as indicated at 64. In some cases, the packet may be sent through an encryption/decryption engine 32 before it leaves the system 10 as indicated at block 78.

Periodically, the outbound flow cache module 30 is analyzed by the anomaly detection agent 44, running in the sideband processing elements 23. The anomaly detection agent 44 analyzes the flow cache connection table and does a heuristic-based behavioral analysis on the flow cache data to detect the occurrence of worms. When worm behavior is detected, the anomaly detection agent can start throttling the outbound traffic. Then, the rate of infection by a potential worm is curbed.

During a subsequent risk assessment scan, if the host validation agent 42 detects that the host side security agents 16 has been tampered with or disabled, then this provides a stronger indication to the anomaly detection agent 44 that the system 10 was in fact infected. The agent 42 may monitor the agents 16 by direct access to host memory if both elements are on the same integrated circuits or via a bus, if not, such as the Peripheral Component Interconnect bus. (See PCI Specification, Rev. 2.2, available from PCI Special Interest Group, Portland, Oreg. 97221). The agents 16 may be analyzed, for example, by comparing their current images to stored images or determining if those agents have been patched or whether the files for those agents are up-to-date. The agent 44 can completely block the traffic and alert either a local or a remote administrator. However, if the risk assessment scan indicates that the host resident firewall or other security agents 16 are up and running, then this is an indication to the anomaly detection agent 44 of a false alarm. The outbound traffic that was previously throttled would then be sent on unimpeded.

Figure 4:
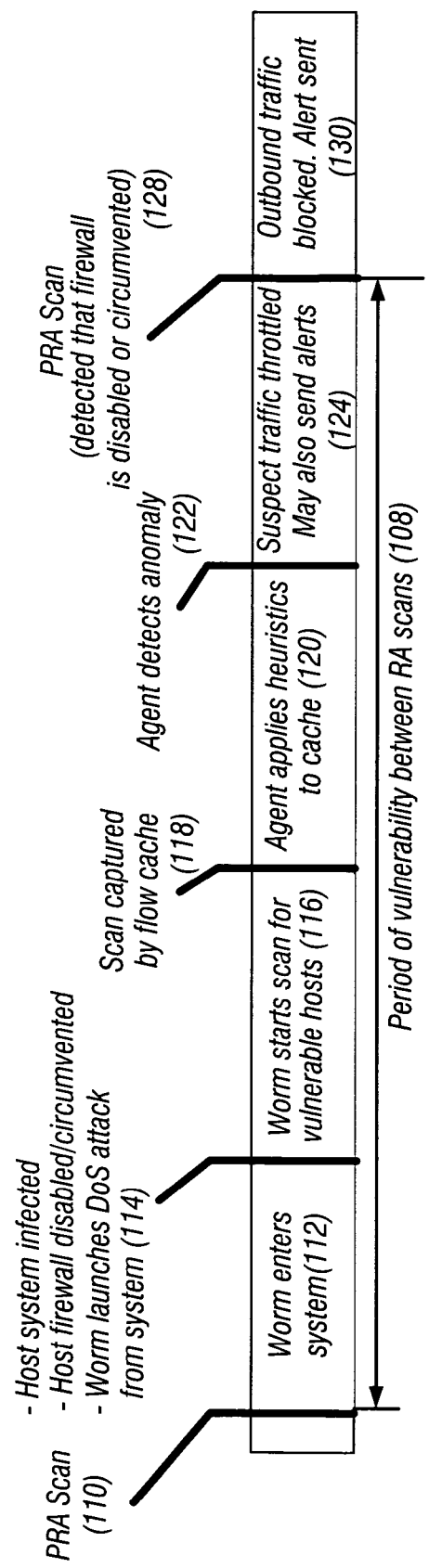
FIG. 4 is a flow for containing a worm in accordance with one embodiment of the present invention.

Thus, referring to FIG. 4, a period of vulnerability 108 is indicated between a first risk assessment scan 110 and a second risk assessment scan 128 that detected that the firewall was disabled or circumvented in this case. After the first risk assessment scan 110, it may be determined that the host 12 is infected, that the host firewall is disabled or circumvented, and that a worm has launched a denial of service attack from the system as indicated at 114. Thus, a worm may enter the system (112) after the first risk assessment scan 110 which would indicate no problems. The worm then infects the system and starts a scan for vulnerable hosts on the network 38 as indicated at 116. The scan is captured (118) by the flow cache module 30. The agent 44 then applies heuristics to the cache as indicated at 120. The agent 44 detects the anomaly at 122 and suspect traffic is throttled as indicated at 124. Alerts may also be sent. Then, the next risk assessment 128 scan detects that the firewall is disabled or circumvented. Outbound traffic may be blocked and an alert sent as indicated at 130.

Figure 5:
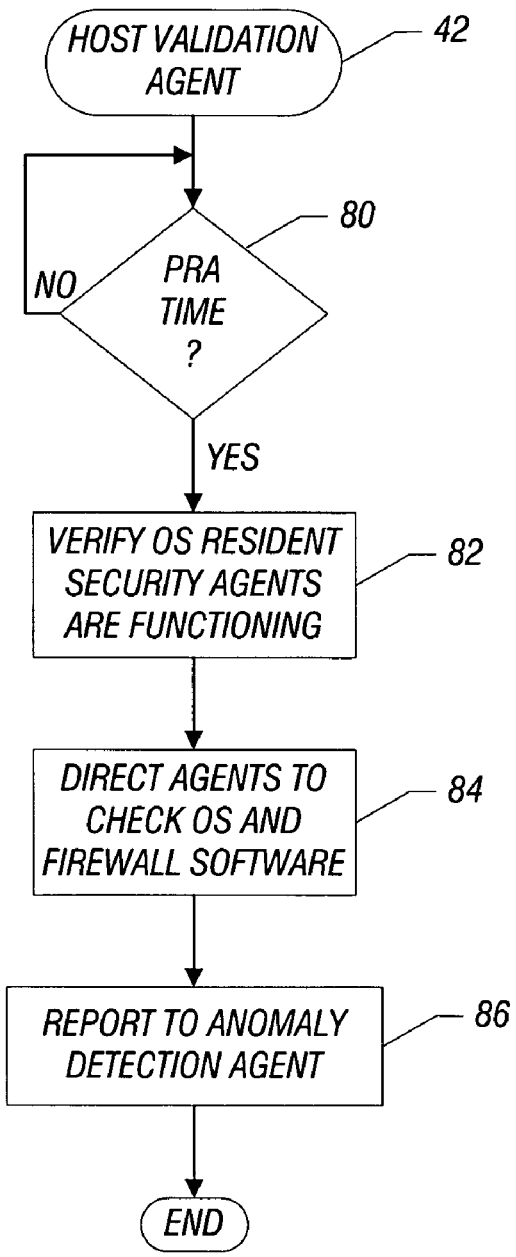
FIG. 5 is a flow chart for a host validation agent in accordance with one embodiment of the present invention.

Referring to FIG. 5, a flow chart for one embodiment of the host validation agent 42 determines whether it is risk assessment time at diamond 80. If so, the operating system resident security agent 16 is checked to see if it is still functioning. Agent 42 is then directed to check the operating system and the firewall software as indicated in block 84. Then, the host validation agent 42 reports to the anomaly detection agent 44 as indicated in block 86.

Figure 6:
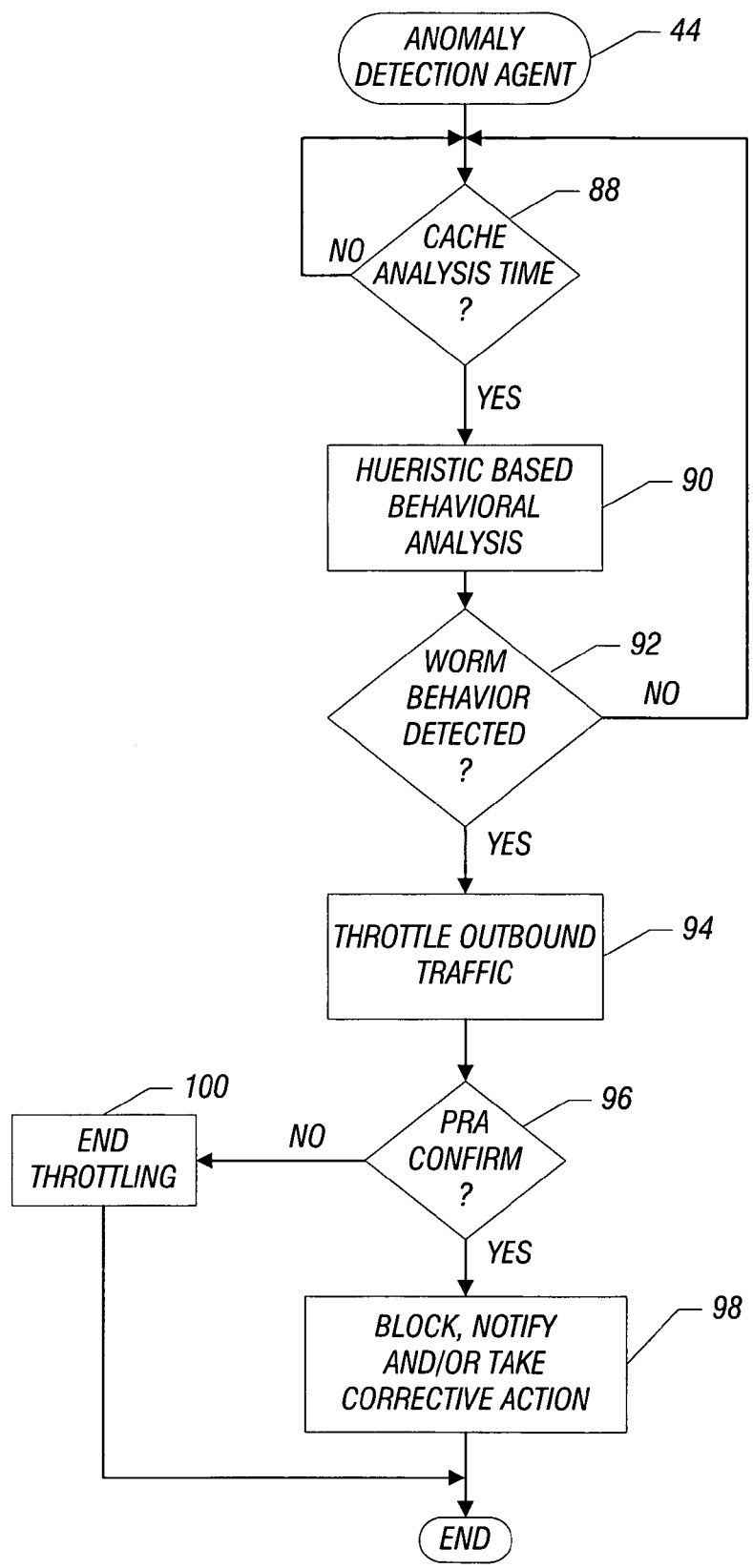
FIG. 6 is a flow chart for an anomaly detection agent in accordance with one embodiment of the present invention.

Referring next to FIG. 6, the operation of the anomaly detection agent 44 is depicted in accordance with one embodiment. If it is a cache analysis time, as determined at diamond 88, heuristic-based behavior analysis may be implemented at block 90. If worm behavior is detected in diamond 92, outbound traffic may be throttled as indicated in block 94. At the next risk assessment time, a check at diamond 96 determines whether the risk assessment confirms the worm detection. If so, outbound traffic may be blocked, agents may be notified, or other corrective action may be taken as indicated at block 98. If the risk assessment does not confirm a threat, then the throttling may be ended as indicated at block 100.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method comprising:
   an apparatus coupled to a processor, wherein the apparatus including security agents; and
   the said security agents performing the operations of:
   checking for behavior indicative of a worm by monitoring inbound and outbound packet flow;
   wherein checking includes applying heuristics to determine whether a worm attack may have occurred; and
   in response to an indication of worm behavior between risk assessment scans:
      taking corrective action to prevent the spread of a worm prior to conducting a risk assessment scan;
      isolating a host from a network in response to a risk assessment scan indicating that host resident security agents have been altered; and
      throttling outbound packets.

2. The method of claim 1 including terminating the throttling if a risk assessment scan indicates that a worm attack has not occurred.

3. The method of claim 1 wherein checking for behavior indicative of a worm includes analyzing characteristics of packet headers.

4. The method of claim 3 including storing information related to recent packet flows.

5. The method of claim 1 including checking for behavior indicative of a worm between risk assessment scans more frequently than risk assessment scans are conducted.

6. The method of claim 1 including checking for a virus or worm signature between risk assessment scans.

7. An article comprising a computer readable memory device storing instructions that, if executed, enable a processor-based system to:
   check for behavior indicative of a worm by monitoring inbound and outbound packet flow;
   apply heuristics to determine whether a worm attack may have occurred; and
   in response to worm behavior:
      enable the processor-based system to take corrective action to prevent the spread of a worm prior to conducting a risk assessment scan;
      enable the processor-based system to isolate a host from a network in response to a risk assessment scan indicating that host resident security agents have been altered; and
      enable the processor-based system to throttle outbound packets.

8. The article of claim 7 further storing instructions that, if executed, enable the processor-based system to terminate the throttling is a risk assessment scan indicates that a worm attack has not occurred.

9. The article of claim 7 further storing instructions that, if executed, enable the processor-based system to analyze characteristics of packet headers.

10. The article of claim 9 further storing instructions that, if executed, enable the processor-based system to store information related to recent packet flows.

11. The article of claim 7 further storing instructions that, if executed, enable the processor-based system to check for behavior indicative of a won-n between risk assessment scans more frequently than risk assessment scans are conducted.

12. The article of claim 7 further storing instructions that, if executed, enable the processor-based system to check for a virus or worm signature between risk assessment scans.

13. An apparatus comprising:
    a first agent to periodically conduct risk assessment scans for host resident security agents;
    wherein said first agent to isolate a host from a network in response to a risk assessment scan indicating that host resident security agents have been altered; and
    a second agent to check for behavior indicative of a worm between risk assessment scans by monitoring inbound and outbound packet flow and,
    in response to worm behavior, wherein said second agent:
       apply heuristics to determine whether a worm attack may have occurred;
       take corrective action to prevent the spread of a worm prior to conducting a risk assessment scan; and
       throttle outbound packets.

14. The apparatus of claim 13 wherein said first and second agents are part of microcontroller.

15. The apparatus of claim 14 wherein said agents are part of an embedded microcontroller.

16. The apparatus of claim 13 including a device to interface said apparatus to a packet processing device.

17. The apparatus of claim 16 including an interface to a host including host resident security agents.

18. The apparatus of claim 17 including an interface to a network controller.

19. The apparatus of claim 13 wherein said second agent to analyze characteristics of packet headers.

20. The apparatus of claim 13 wherein said first agent to conduct risk assessment scans less frequently than said second agent checks for behavior indicative of a worm between risk assessment scans.

21. A system comprising:
    a processor;
    a storage storing security agents;
    an apparatus coupled to said processor including a first agent to periodically conduct risk assessment scans of said security agents;

wherein said first agent to isolate the system from a network in response to a risk assessment scan indicating that the security agents have been altered;
a second agent to check for behavior indicative of a worm between risk assessment scans by monitoring inbound and outbound packet flows and,
in response to worm behavior, wherein said second agent:
   apply heuristics to determine whether a worm attack may have occurred;
   take corrective action to prevent the spread of a worm prior to conducting a risk assessment scan; and
   throttle outbound packets; and
a network controller coupled to said apparatus.

22. The system of claim 21 wherein said second agent to analyze characteristics of packet headers.

23. The system of claim 21 wherein said first agent to conduct risk assessment scans less frequently than said second agent checks for behavior indicative of a worm between risk assessment scans.

* * * * *

UNITED STATES PATENT AND TRADEMARK OFFICE
CERTIFICATE OF CORRECTION

PATENT NO. : 7,797,749 B2  Page 1 of 1
APPLICATION NO. : 10/980015
DATED : September 14, 2010
INVENTOR(S) : Priya Rajagopal et al.

It is certified that error appears in the above-identified patent and that said Letters Patent is hereby corrected as shown below:

Column 8:
Line 19, "won-n" should be --worm--.

Signed and Sealed this

Ninth Day of November, 2010

David J. Kappos
*Director of the United States Patent and Trademark Office*